United States Patent Office 2,811,419
Patented Oct. 29, 1957

2,811,419

PROCESS FOR PRODUCING MONOMERIC PHOSPHATES

Gerhard Hartlapp and Franz Rodis, Knapsack, near Koln, Germany, assignors to Knapsack-Griesheim Aktiengesellschaft, Knapsack, near Koln, Germany, a German company No Drawing. Application March 16, 1954,
Serial No. 416,717

Claims priority, application Germany March 21, 1953

2 Claims. (Cl. 23—107)

The present invention relates to alkali metal phosphate products which may contain, beside alkali metal triphosphate, substantially alkali metal pyrophosphate, and to a process for producing such products. The products according to the invention may practically consist of alkali metal triphosphate or they may at least contain a high percentage of alkali metal triphosphate; however, according to the invention there can also be obtained such products in which the content of alkali metal pyrophosphate is preponderant and may even amount up to 100%. The products contain no other substances in substantial amounts beside alkali metal triphosphate or beside alkali metal triphosphate and alkali metal pyrophosphate or beside alkali metal pyrophosphate.

These products can be used, for example, as water softening agents, as additions to detergents, as liquefiers for cement slurry and drilling mud in case of soil borings.

For the preparation of the products according to the invention, polyphosphate glass or polyphosphoric acids may be used as starting material.

By "polyphosphate glass" mixtures are meant which consist of various types of alkali metal phosphates, such as ortho-, pyro-, tri- and metaphosphates. In these mixtures the molar ratio of $P_2O_5$: $Na_2O$ and $K_2O$ lies between 1:about 0.3 and 1:about 1.3.

Polyphosphate glass which, according to the invention, may be used as starting material, contains for example about 10% of pyrophosphate or less, about 30% of metaphosphate and the rest is triphosphate.

By "polyphosphoric acids," which are to be used as starting material for the preparation of the products according to the invention, there are meant such mixtures of tripolyphosphoric and pyrophosphoric acid which, beside contain orthophosphoric or metaphosphoric acid or both of them. Mixtures of this type for example consist of about 10% of pyrophosphoric acid or less, about 30% of metaphosphoric acid, and the rest is triphosphoric acid.

For preparing the products of the invention, the above mentioned starting materials are at first subjected to a treatment of "alkalizing" in the presence of water. The solution so obtained, which has a pH value between about 8 and about 12, is then heated. The solution needs to be heated only for a relatively short time, for example, for about 5 to about 30 seconds.

By "alkalizing" a treatment of the starting material used with alkaline substances is meant, for example, a treatment with a solution of sodium carbonate or potassium carbonate, at temperatures between about 50° and about 60° C., which is continued until the reaction exceeds the neutral point. In general the starting material is introduced into the alkaline solution. It is of advantage to avoid raising the temperature considerably above 60° C. "Alkalizing" takes place in the presence of water. The quantity of water required is in general about ½ to about 2 times the quantity of the starting material. It is of advantage to have the ratio of water to the starting material of about 0.75 to about 1.5. The reaction during the "alkalizing" takes place instantaneously, the time taken for treating the material with alkali is, therefore, of no special importance and depends normally on the time used for introducing the starting material into the alkaline solution. Consequently, it varies according to the quantities used and generally, when working on an industrial scale, this time is about 30 minutes.

Not necessary, but desirable in some cases is the addition of alkali hydroxide to the solution after alkalizing, in order to increase the pH value a little further.

Heating of the solution after alkalizing or after addition of alkali hydroxide is advantageously effected by spraying the solution through a nozzle. The solution which has generally a temperature of 40°–60° C. is atomized by means of a nozzle in an ordinary atomizing tower which is heated by a heating device to about 300° to about 400° C., preferably to 320° C. The solution which has been sprayed in the upper part of the tower is heated instantaneously by the prevailing temperature as soon as it has left the nozzle. The solid particles fall to the bottom of the tower as dry dust. The height of such a tower is, for example, 10–15 m. and its diameter is 3–5 m. The solution which has been sprayed in the upper part of the tower falls to the ground within about 5–30 seconds and that sprayed in the middle part within 10 seconds; the product obtained is a fine dry powder. The powder and the dry air are sucked into a cyclone in which the powder is separated from the dry air and removed in the usual manner.

If, for example, a solution alkalized as above described and containing about 60–70% of solid constituents, is atomized in the said way, a product is obtained which contains 95–100% of alkali metal tri-phosphate.

While atomizing the solution, in addition to the drying process the following reaction mainly takes place:

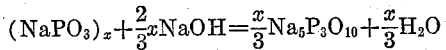

$$(NaPO_3)_x + \tfrac{2}{3}xNaOH = \tfrac{x}{3}Na_5P_3O_{10} + \tfrac{x}{3}H_2O$$

which represents the formation of triphosphate from metaphosphate by the action of alkali with elimination of water, the molar ratio of $P_2O_5$:$Na_2O$ being as represented in the above equation.

If the spraying is effected with substances having a different molar ratio of $P_2O_5$:$Na_2O$, according to the equation:

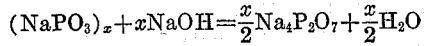

$$(NaPO_3)_x + xNaOH = \tfrac{x}{2}Na_4P_2O_7 + \tfrac{x}{2}H_2O$$

then pyrophosphate, formed from the metaphosphate under the influence of the alkali, is obtained as end product. It results from these equations that pure alkali metal triphosphate and also alkali metal pyrophosphate can be obtained depending on the molar ratio of the substances used. Thus, by varying the pH-value, the composition of the substances or the content of pyrophosphate in the end product can be regulated as desired.

The alkali metal phosphate products obtained according to the invention consist of mixtures of alkali metal triphosphate in an amount from 0 to 100% and alkali metal pyrophosphate in an amount from 100 to 0%, said mixtures being in a finely subdivided state.

The following examples serve to illustrate the invention but they are not intended to limit it thereto:

Example 1

1600 gms. of anhydrous sodium carbonate of 98% strength and 2 liters of water are added to 2600 grams of acid sodium polyphosphate glass having a molar ratio of $P_2O_5$ to $Na_2O$ as 1:0.5, the temperature being maintained between 50° and 60° C. The pH-value of this solution is then 9.4. 275 grams of sodium hydroxide are added, and the solution, having now a pH value of 11.4 and a content of solid constituents of about 60%, is sprayed through a nozzle as described above. Yield: 99% of a product which has a total content of $P_2O_5$ of 57.4%, 41.6% thereof being present as $Na_5P_3O_{10}$ and 12.8% as $Na_4P_2O_7$. Consequently, the end product contains 72.2% of sodium triphosphate and 24.0% of sodium pyrophosphate.

Example 2

1200 grams of anhydrous sodium carbonate of 98% strength and 4.2 liters of water are added at a temperature of 50° C. to 60° C. to 5875 grams of acid sodium polyphosphate glass having a molar ratio of $P_2O_5$ to $Na_2O$ as 1:1.3 and containing 50.5% of $Na_5P_3O_{10}$ and 49.4% of $(NaPO_3)_x$. The solution having now a pH-value of 9.6 and a content of solid constituents of about 61%, is sprayed through a nozzle as described above. A mixture of 17.1% of $Na_4P_2O_7$ and 81.6% of $Na_5P_3O_{10}$ is obtained, having a total content of $P_2O_5$ of 56.1%. Yield amounts to about 99%.

Example 3

1300 gms. of acid sodium polyphosphate glass having a molar ratio of $P_2O_5:Na_2O$ as 1:0.5 are mixed with 800 gms. of anhydrous sodium carbonate of 98% strength and 1 liter of water at a temperature of 50°–60° C. The total volume of this solution amounts then to 1700 cc., its pH value is 9.4. Then 75 gms. of sodium hydroxide in 100 cc. of water are added and the solution which has a pH value of 11.3 and a content of solid constituents of about 62% is sprayed through a nozzle as described above. Sodium triphosphate is obtained which has a total content of $P_2O_5$ of 57.5%, 56.4% thereof being present as sodium triphosphate ($Na_5P_3O_{10}$) and 1% as sodium pyrophosphate ($Na_4P_2O_7$). Yield: 99% of a product having a content of sodium triphosphate of 98% and of sodium pyrophosphate of 1.8%.

Example 4

5150 gms. of anhydrous sodium carbonate of 98% strength and 5 liters of water are added, at a temperature of 50° to 60° C., to 5000 gms. of polyphosphoric acid of the following composition: 3.87% of $H_3PO_4$, 6.4% of $H_4P_2O_7$, 47% of $H_5P_3O_{10}$, 34% of $(HPO_3)_x$, 10% of cyclic metaphosphates, total content of $P_2O_5=84.4\%$. The pH value of this solution is then 9.7. The solution having a content of solid constituents of about 59% is sprayed through a nozzle as described above. A mixture of 51% of sodium triphosphate and 48% of sodium pyrophosphate having a total content of $P_2O_5$ of 55.7%, is obtained. Yield: about 99%.

Example 5

3590 gms. of sodium carbonate of 98% strength and 4.4 liters of water are added, at a temperature of 50°–60° C., to 3325 gms. of polyphosphoric acid of the following composition: 9.4% of $H_3PO_4$, 21.9% of $H_4P_2O_7$, 48.4% of $H_5P_3O_{10}$, 12.0% of $(HPO_3)_x$, 8.0% of cyclic metaphosphates, total content of $P_2O_5=82.5\%$. The pH value of this solution is 8.5. The solution which has a content of solid constituents of about 53% is sprayed through a nozzle as described above thus obtaining a mixture of 97% of $Na_5P_3O_{10}$ and 2.5% of $Na_4P_2O_7$ having a total content of $P_2O_5$ of 57.4%. The yield amounts to 99%.

Example 6

3770 grams of sodium carbonate of 98% strength and 4 liters of water are added to 5200 grams of sodium polyphosphate glass having a molar ratio of $P_2O_5:Na_2O$ as 1:0.5 in which procedure the temperature must not exceed 60° C. The pH-value of the solution so obtained amounts to about 9.8. The solution having a content of solid constituents of 65% is sprayed through a nozzle as described above. The yield amounts to 99% of pure sodium triphosphate. The total content of $P_2O_5$ is 57.5% while that of triphosphate-$P_2O_5$ also amounts to 57.5%.

Example 7

1662 grams of sodium carbonate of 98% strength and 3.5 liters of water are added at a temperature of about 60° C. to 4790 grams of sodium polyphosphate glass having a molar ratio of $P_2O_5:Na_2O$ as 1:0.9. The pH-value of this solution is about 9.7. The solution, having a content of solid constituents of 58%, is sprayed through a nozzle as described above. A yield of 99% is obtained having a content of $P_2O_5$ of 57%, 95% thereof is present as sodium triphosphate and 4.5% as sodium pyrophosphate.

We claim:

1. A process for the production of monomeric alkali metal triphosphate, monomeric alkali metal pyrophosphate and mixtures thereof which comprises treating a substance selected from the group consisting of polyphosphate glasses and polyphosphoric acids with an alkaline substance in the presence of water at a temperature ranging between 50° C. and about 60° C. to obtain a solution having a pH value from about 8 to about 12, atomizing resulting solution into an upper portion of a zone preheated to a temperature of from about 300° C. to about 400° C., allowing resulting particles to fall to the bottom of said zone, the time of fall to the bottom of said zone being from about 5 to 30 seconds and, without further treatment, withdrawing resulting monomeric product as a fine dry powder from the bottom of said zone.

2. The product formed by the process of claim 1.

References Cited in the file of this patent

UNITED STATES PATENTS

| | | |
|---|---|---|
| 1,654,283 | Dickerson | Dec. 27, 1927 |
| 2,019,665 | Fiske et al. | Nov. 5, 1935 |
| 2,133,286 | Fiske et al. | Oct. 18, 1938 |
| 2,174,614 | Bornemann | Oct. 3, 1939 |
| 2,419,147 | King | Apr. 15, 1947 |
| 2,419,148 | King | Apr. 15, 1947 |

FOREIGN PATENTS

| | | |
|---|---|---|
| 378,345 | Great Britain | Aug. 11, 1932 |
| 441,474 | Great Britain | Jan. 20, 1936 |
| 495,192 | Great Britain | Nov. 8, 1938 |
| 543,911 | Great Britain | Mar. 19, 1942 |